(12) United States Patent
Akiyama

(10) Patent No.: US 11,105,701 B2
(45) Date of Patent: Aug. 31, 2021

(54) DYNAMOMETER CONTROL DEVICE

(71) Applicant: MEIDENSHA CORPORATION, Tokyo (JP)

(72) Inventor: Takao Akiyama, Tokyo (JP)

(73) Assignee: Meidensha Corporation, Tokyo (JP)

( * ) Notice: Subject to any disclaimer, the term of this patent is extended or adjusted under 35 U.S.C. 154(b) by 16 days.

(21) Appl. No.: 16/646,335

(22) PCT Filed: Jun. 14, 2018

(86) PCT No.: PCT/JP2018/022746
§ 371 (c)(1),
(2) Date: Mar. 11, 2020

(87) PCT Pub. No.: WO2019/053979
PCT Pub. Date: Mar. 21, 2019

(65) Prior Publication Data
US 2020/0271539 A1 Aug. 27, 2020

(30) Foreign Application Priority Data

Sep. 13, 2017 (JP) .............................. JP2017-175378

(51) Int. Cl.
*G01M 1/10* (2006.01)
*G01L 1/10* (2006.01)
(Continued)

(52) U.S. Cl.
CPC ................ *G01M 1/10* (2013.01); *G01L 1/10* (2013.01); *G01L 3/02* (2013.01); *G01M 13/025* (2013.01)

(58) Field of Classification Search
None
See application file for complete search history.

(56) References Cited

U.S. PATENT DOCUMENTS 8,983,715 B2 * 3/2015 Falkenstein ......... G01M 17/007
701/32.8
9,116,062 B2 * 8/2015 Akiyama .................. G01L 3/24
(Continued)

FOREIGN PATENT DOCUMENTS

JP        2002071520 A       3/2002
JP        2013257234 A      12/2013
(Continued)

*Primary Examiner* — Freddie Kirkland, III
(74) *Attorney, Agent, or Firm* — Muncy, Geissler, Olds & Lowe, P.C.

(57) ABSTRACT

An input-side control device includes: a feedback controller that generates a first control input signal for eliminating the difference between a model speed signal ωm and a speed detection signal ω by using the signal difference between a higher order torque command signal Tref and an axial torque detection signal Tsh to generate the model speed signal ωm which corresponds to the rotational speed of an inertial body having a set moment of inertia Jset moving under a torque corresponding to the signal difference; a feed-forward controller that generates a second control input signal by multiplying the signal difference by k·Jdy/Jset; and a low-pass filter that generates a torque command signal Tr from a signal obtained by combining the outputs of the controllers and attenuating components at a higher frequency than a cut-off frequency fc set in the vicinity of the resonant frequency.

4 Claims, 10 Drawing Sheets

(51) Int. Cl.
  *G01L 3/02* (2006.01)
  *G01M 13/025* (2019.01)

(56) References Cited

U.S. PATENT DOCUMENTS

| | | | |
|---|---|---|---|
| 9,234,820 B2* | 1/2016 | Akiyama | G01M 15/00 |
| 9,689,774 B2* | 6/2017 | Kanke | G01M 13/025 |
| 10,151,666 B2* | 12/2018 | Kanke | G01M 15/044 |
| 10,444,117 B2* | 10/2019 | Akiyama | G05B 13/04 |
| 10,942,091 B2* | 3/2021 | Akiyama | G01M 17/007 |
| 2013/0138290 A1 | 5/2013 | Falkenstein | |
| 2015/0142341 A1* | 5/2015 | Akiyama | G01M 13/025 702/41 |
| 2015/0219529 A1 | 8/2015 | Akiyama et al. | |

FOREIGN PATENT DOCUMENTS

| | | |
|---|---|---|
| JP | 2016080388 A | 5/2016 |
| JP | 2016206177 A | 12/2016 |
| WO | WO 2014/010409 A1 | 1/2014 |

* cited by examiner

DYNAMOMETER CONTROL DEVICE

TECHNICAL FIELD

The present invention relates to a dynamometer control device. More specifically, the present invention relates to a dynamometer control device which is used in a test system that includes a test piece including an input shaft and an output shaft, for example, a drivetrain of a vehicle, and an input-side dynamometer coupled to the input shaft of the test piece.

BACKGROUND ART

A drivetrain collectively refers to a plurality of devices that transmit energy generated by an engine to drive wheels, and includes the engine, a clutch, a transmission, a drive shaft, a propeller shaft, a differential gear, the drive wheels, and the like. A test system for the drivetrain evaluates the durability, quality, or the like of the drivetrain while applying a loading torque, which simulates the inertia of tires or a vehicle body, to an output shaft by causing the engine to actually drive the transmission, and performing electric inertia control of an output-side dynamometer connected to the output shaft of the drivetrain (for example, refer to Patent Document 1). In addition, in recent years, there is proposed a test system that generates a drive torque, which is input to an input shaft of the drivetrain, with an input-side dynamometer instead of the actual engine (for example, refer to Patent Document 2).

A periodic torque fluctuation occurs in the actual engine due to a combustion stroke of each cylinder. Accordingly, the test system improves the reproducibility of a test by fluctuating the torque of the input-side dynamometer at a predetermined period and a predetermined amplitude while rotating an input shaft of a test piece so as to simulate such an actual engine torque fluctuation. More specifically, a torque command signal is obtained by combining a base torque component of the direct current for generating a constant drive torque and an excitation torque component of the alternating current which is characterized by a predetermined excitation frequency and a predetermined excitation amplitude, and the torque command signal is input to an inverter of the dynamometer (for example, refer to Patent Document 3).

Patent Document 1: PCT International Publication No. WO2014/010409
Patent Document 2: Japanese Unexamined Patent Application, Publication No. 2013-257234
Patent Document 3: Japanese Unexamined Patent Application, Publication No. 2002-71520

DISCLOSURE OF THE INVENTION

Problems to be Solved by the Invention

By the way, an actual moment of inertia of the input-side dynamometer (hereinafter, also referred to as a "moment of inertia of a dynamometer") differs from a moment of inertia of the actual engine which is intended to be simulated thereby. More specifically, the moment of inertia of the dynamometer is larger than the moment of inertia of the actual engine. For this reason, in order to improve the reproducibility of the test, it is necessary to perform inertia-lowering control to control the input-side dynamometer such that the moment of inertia of the dynamometer becomes a set moment of inertia which is set to a value smaller than the moment of inertia of the dynamometer.

FIG. 10 is a graph showing a change in the rotational speed (the number of revolutions per unit time) of the input-side dynamometer when a torque command signal which is not subjected to the inertia-lowering control is input to the input-side dynamometer. In FIG. 10, the dashed line illustrates a change in rotational speed which is realized when the same torque command signal is input to a virtual dynamometer having a set moment of inertia which is set to a value smaller than the moment of inertia of the dynamometer. Namely, the dashed line in FIG. 10 illustrates an ideal change in rotational speed which the input-side dynamometer desires to realize by performing the inertia-lowering control. As shown in FIG. 10, the speed of increase of the rotational speed differs between the input-side dynamometer and the virtual dynamometer. More specifically, a moment of inertia of the virtual dynamometer is smaller than that of the input-side dynamometer, and thus, the rotational speed of the virtual dynamometer increases rapidly.

As described above, in order to improve the reproducibility of the actual engine which is attained by the input-side dynamometer, the test system for the drivetrain is required to perform the inertia-lowering control of the input-side dynamometer. Here, for example, Patent Document 1 filed by the applicant of this application discloses a specific method for performing the inertia-lowering control of the output-side dynamometer coupled to an output shaft of the test piece. However, a specific method for performing the inertia-lowering control of the input-side dynamometer coupled to the input shaft of the test piece has not been sufficiently studied so far.

Here, the inertia-lowering control of the output-side dynamometer disclosed in Patent Document 1 is also considered to be applied to the input-side dynamometer as it is. However, since the input shaft and the output shaft are differently affected by torsional vibration, it is not apparent whether or not a stable inertia-lowering control can be performed.

An object of the present invention is to provide a dynamometer control device capable of performing a stable inertia-lowering control of an input-side dynamometer in a test system including the input-side dynamometer that is coupled to an input shaft of a test piece including the input shaft and an output shaft.

Means for Solving the Problems (1) A test system (for example, a test system 1 to be described later) includes a dynamometer (for example, an input-side dynamometer 21 to be described later) coupled to an input shaft of a test piece (for example, a test piece W to be described later) including the input shaft (for example, an input shaft SI to be described later) and an output shaft (for example, output shafts SO1 and SO2 to be described later); an inverter (for example, an input-side inverter 22 to be described later) that supplies an electrical power in accordance with a torque command signal (for example, an input-side torque command signal Tr to be described later) to the dynamometer; a speed detector (for example, an input-side encoder 23 to be described later) that generates a speed detection signal (for example, an input-side speed detection signal $\omega$ to be described later) in accordance with a rotational speed of the dynamometer; and a shaft torque detector (for example, an input-side shaft torque meter 24 to be described later) that generates a shaft torque detection signal (for example, an input-side shaft torque detection signal Tsh to be described later) in accordance with a shaft torque applied to the input shaft. According to the present invention, there is provided a dynamometer control device (for example, an input-side control device 5 to be described later) that generates the torque command signal by using the speed detection signal and the shaft torque detection signal, the dynamometer control device including a feedback controller (for example, a feedback controller 51 to be described later) that uses a signal difference (for example, a signal difference (Tref−Tsh) to be described later) between a higher order command signal (for example, a higher order command signal Tref to be described later) for the torque command signal and the shaft torque detection signal to generate a model speed signal (for example, a model speed signal em to be described later) which corresponds to a rotational speed of an inertial body having a set moment of inertia (for example, a set moment of inertia Jset to be described later) smaller than a moment of inertia (for example, an input-side moment of inertia Jdy to be described later) of the dynamometer when the inertial body makes a motion under an application of a torque corresponding to the signal difference, and generate a first control input signal for eliminating a difference between the model speed signal and the speed detection signal; a feed-forward controller (for example, a feed-forward controller 55 to be described later) that generates a second control input signal by multiplying the signal difference by a coefficient of which a value is set based on the moment of inertia of the dynamometer and the set moment of inertia; and a filter (for example, a low-pass filter 57 to be described later) that generates the torque command signal by attenuating a component, which has a higher frequency than a cut-off frequency (for example, a cut-off frequency fc to be described later) that is set in the vicinity of a resonant frequency on an input shaft side of the test piece, from a signal obtained by combining the first control input signal and the second control input signal.

(2) In this case, it is preferable that the test piece is a drivetrain of a vehicle and the filter is a second-order low-pass filter.

(3) In this case, it is preferable that the coefficient is set to a larger value as the moment of inertia of the dynamometer is increased and is set to a smaller value as the set moment of inertia is increased.

Effects of the Invention (1) The dynamometer control device of the present invention includes the feedback controller, the feed-forward controller, and the filter, and generates the torque command signal for the dynamometer coupled to the input shaft of the test piece by using these components. The feedback controller uses the signal difference between the higher order command signal for the torque command signal and the shaft torque detection signal to generate the model speed signal which corresponds to the rotational speed of the inertial body having the set moment of inertia smaller than the moment of inertia of the dynamometer when the inertial body makes a motion under the application of the torque corresponding to the signal difference, and generate the first control input signal for eliminating the difference between the model speed signal and the speed detection signal. By generating the first control input signal according to the foregoing procedure based on a calculation modeling the inertial body having the set moment of inertia, the dynamometer control device of the present invention can perform the inertia-lowering control of the dynamometer such that the moment of inertia of the dynamometer becomes the set moment of inertia smaller than the moment of inertia of the dynamometer. Here, when the input shaft of the test piece is connected to the dynamometer, torsional vibration occurs in the input shaft; and thereby, the foregoing feedback controller alone may not be able to perform a stable inertia-lowering control due to the torsional vibration. In contrast, in the present invention, the feed-forward controller generates the second control input signal by multiplying the signal difference between the higher order command signal and the shaft torque detection signal by the coefficient of which the value is set based on the moment of inertia of the dynamometer and the set moment of inertia, and the filter generates the torque command signal by attenuating the component, which has the higher frequency than the cut-off frequency that is set in the vicinity of the resonant frequency on the input shaft side of the test piece, from the signal obtained by combining the first control input signal and the second control input signal. The dynamometer control device of the present invention can perform a stable inertia-lowering control of the dynamometer coupled to the input shaft by concurrently using the feed-forward controller and the filter described above in addition to the feedback controller.

(2) In the dynamometer control device of the present invention, the test piece is the drivetrain, and the second-order low-pass filter is used as the filter that attenuates the component having a high frequency in the torque command signal. Generally, in the drivetrain, resonance characteristics differ between the input shaft side connected to an engine and an output shaft side connected to drive wheels. In the dynamometer control device of the present invention, since the second-order low-pass filter is used as the filter, an attenuation gradient in a high frequency region of a shaft torque for the torque command signal on the input shaft side can be brought close to an attenuation gradient in a high frequency region of a shaft torque for the torque command signal on the output shaft side, and the inertia-lowering control of the dynamometer on the input shaft side can be further stabilized.

(3) In the dynamometer control device of the present invention, as the coefficient by which the signal difference is multiplied, the feed-forward controller uses a coefficient which is set to a larger value as the moment of inertia of the dynamometer is increased and is set to a smaller value as the set moment of inertia is increased. Therefore, the inertia-lowering control of the dynamometer on the input shaft side can be further stabilized.

PREFERRED MODE FOR CARRYING OUT THE INVENTION

Figure 1:
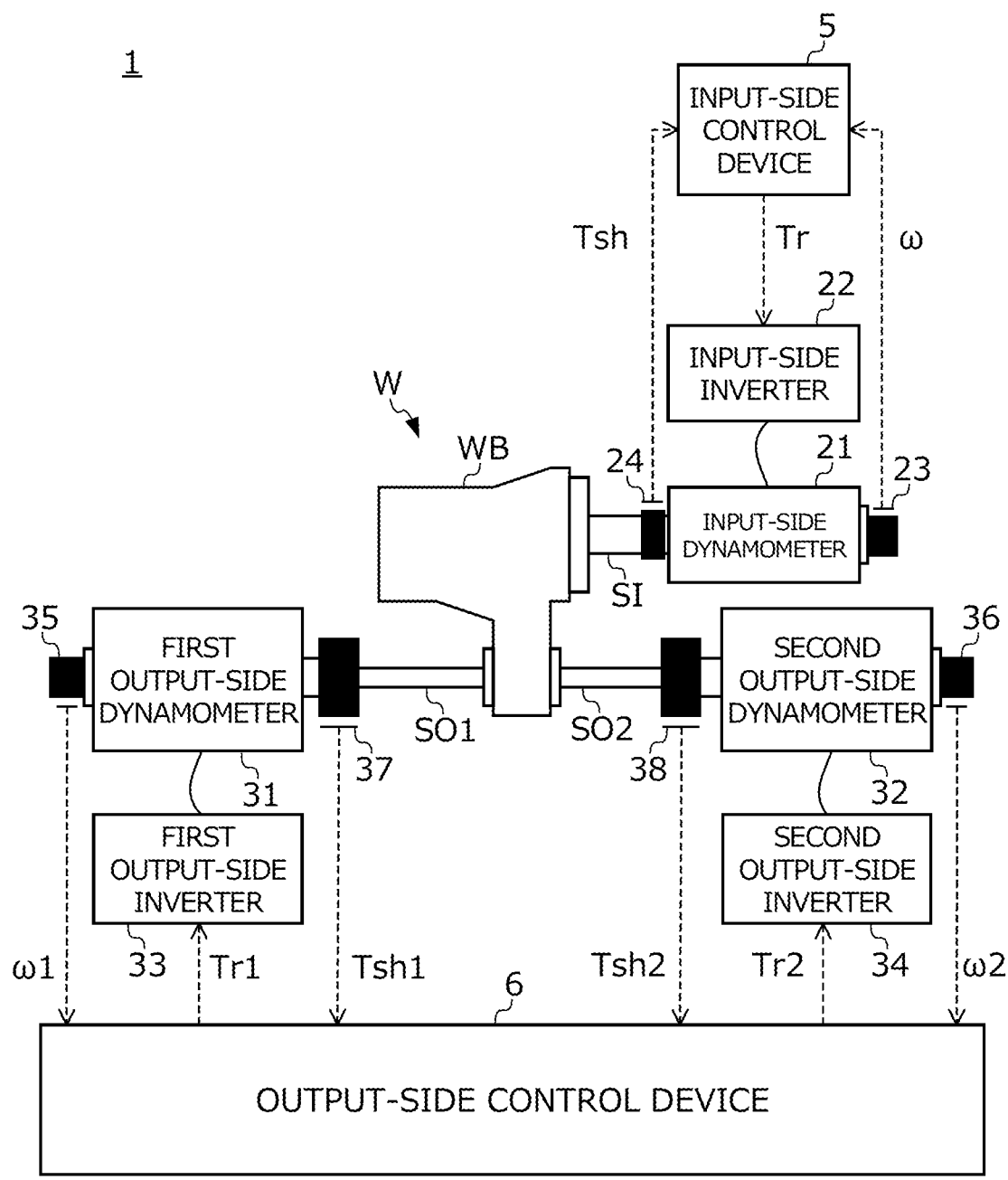
FIG. 1 is a diagram illustrating the configuration of a test system for a drivetrain to which an input-side control device according to one embodiment of the present invention is applied.

Hereinafter, one embodiment of the present invention will be described in detail with reference to the drawings. FIG. 1 is a diagram illustrating the configuration of a test system for a drivetrain to which an input-side control device 5 according to this embodiment is applied. Incidentally, FIG. 1 illustrates an example of the test system 1 including the drivetrain of a FF vehicle as a test piece W; however, the present invention is not limited thereto. The test piece may be, for example, the drivetrain of a FR vehicle.

The test piece W is a combination of an input shaft SI which is connected to an engine (not illustrated) in a state where the test piece W is mounted in a completed vehicle, right and left output shafts SO1 and SO2 which are drive shafts, a clutch, a transmission, a differential gear, and the like, and includes a main body WB which transmits power input from the input shaft SI to the output shafts SO1 and SO2.

The test system 1 includes an input-side dynamometer 21; an input-side inverter 22; an input-side encoder 23; an input-side shaft torque meter 24; a first output-side dynamometer 31; a second output-side dynamometer 32; a first output-side inverter 33; a second output-side inverter 34; a first output-side encoder 35; a second output-side encoder 36; a first output-side shaft torque meter 37; a second output-side shaft torque member 38; the input-side control device 5; and an output-side control device 6.

An output shaft of the input-side dynamometer 21 is coupled to the input shaft SI of the test piece W. When an input-side torque command signal Tr which is generated by a procedure to be described later is input to the input-side inverter 22 from the input-side control device 5, the input-side inverter 22 supplies an electrical power in accordance with the input-side torque command signal Tr to the input-side dynamometer 21. The input-side encoder 23 detects a rotational speed (the number of revolutions of the shaft per unit time) of the output shaft of the input-side dynamometer 21 to generate an input-side speed detection signal ω in accordance with the rotational speed. The input-side speed detection signal co is input to the input-side control device 5. The input-side shaft torque meter 24 detects a shaft torque applied to the input shaft SI, for example, from the amount of distortion in a torsional direction of the shaft to generate an input-side shaft torque detection signal Tsh in accordance with the shaft torque. The input-side shaft torque detection signal Tsh is input to the input-side control device 5.

An output shaft of the first output-side dynamometer 31 is coupled to the output shaft SO1 of the test piece W. When a first output-side torque command signal Tr1 which is generated by a procedure to be described later is input to the first output-side inverter 33 from the output-side control device 6, the first output-side inverter 33 supplies an electrical power in accordance with the first output-side torque command signal Tr1 to the first output-side dynamometer 31. The first output-side encoder 35 detects a rotational speed of the output shaft of the first output-side dynamometer 31 to generate a first output-side speed detection signal ω1 in accordance with the rotational speed. The first output-side speed detection signal ω1 is input to the output-side control device 6. The first output-side shaft torque meter 37 detects a shaft torque applied to the output shaft SO1, for example, from the amount of distortion in a torsional direction of the shaft to generate a first output-side shaft torque detection signal Tsh1 in accordance with the shaft torque. The first output-side shaft torque detection signal Tsh1 is input to the output-side control device 6.

An output shaft of the second output-side dynamometer 32 is coupled to the output shaft SO2 of the test piece W. When a second output-side torque command signal Tr2 which is generated by a procedure to be described later is input to the second output-side inverter 34 from the output-side control device 6, the second output-side inverter 34 supplies an electrical power in accordance with the second output-side torque command signal Tr2 to the second output-side dynamometer 32. The second output-side encoder 36 detects a rotational speed of the output shaft of the second output-side dynamometer 32 to generate a second output-side speed detection signal u2 in accordance with the rotational speed. The second output-side speed detection signal ω2 is input to the output-side control device 6. The second output-side shaft torque meter 38 detects a shaft torque applied to the output shaft S02, for example, from the amount of distortion in a torsional direction of the shaft to generate a second output-side shaft torque detection signal Tsh2 in accordance with the shaft torque. The second output-side shaft torque detection signal Tsh2 is input to the output-side control device 6.

The input-side control device 5 generates the input-side torque command signal Tr according to a procedure which is to be described later with reference to FIGS. 4 to 9 and the like by using input signals such as the input-side speed detection signal co and the input-side shaft torque detection signal Tsh, and inputs the input-side torque command signal Tr to the input-side inverter 22. Therefore, the input-side control device 5 causes the input-side dynamometer 21 to generate a drive torque which simulates the engine of the completed vehicle where the test piece W is mounted, and drives the input shaft SI of the test piece W.

The output-side control device 6 generates the first output-side torque command signal Tr1 and the second output-side torque command signal Tr2 according to a procedure which is to be described later with reference to FIGS. 2 and 3 and the like by using input signals such as the first output-side speed detection signal ω1, the second output-side speed detection signal ω2, the first output-side shaft torque detection signal Tsh1, and the second output-side shaft torque detection signal Tsh2, and inputs the first output-side torque command signal Tr1 and the second output-side torque command signal Tr2 to the first output-side inverter 33 and the second output-side inverter 34. Therefore, the output-side control device 6 applies a load, which simulates the tire inertia or vehicle body inertia of the completed vehicle where the test piece W is mounted, to the output shafts SO1 and SO2 of the test piece W.

The test system 1 evaluates the durability, quality, and the like of the test piece W under a condition close to an actual vehicle traveling condition by causing the input-side control device 5 to drive the input shaft SI of the test piece W and at the same time, causing the output-side control device 6 to apply the load which simulates the tire inertia or vehicle body inertia to the output shafts SO1 and SO2 of the test piece W.

Figure 2:
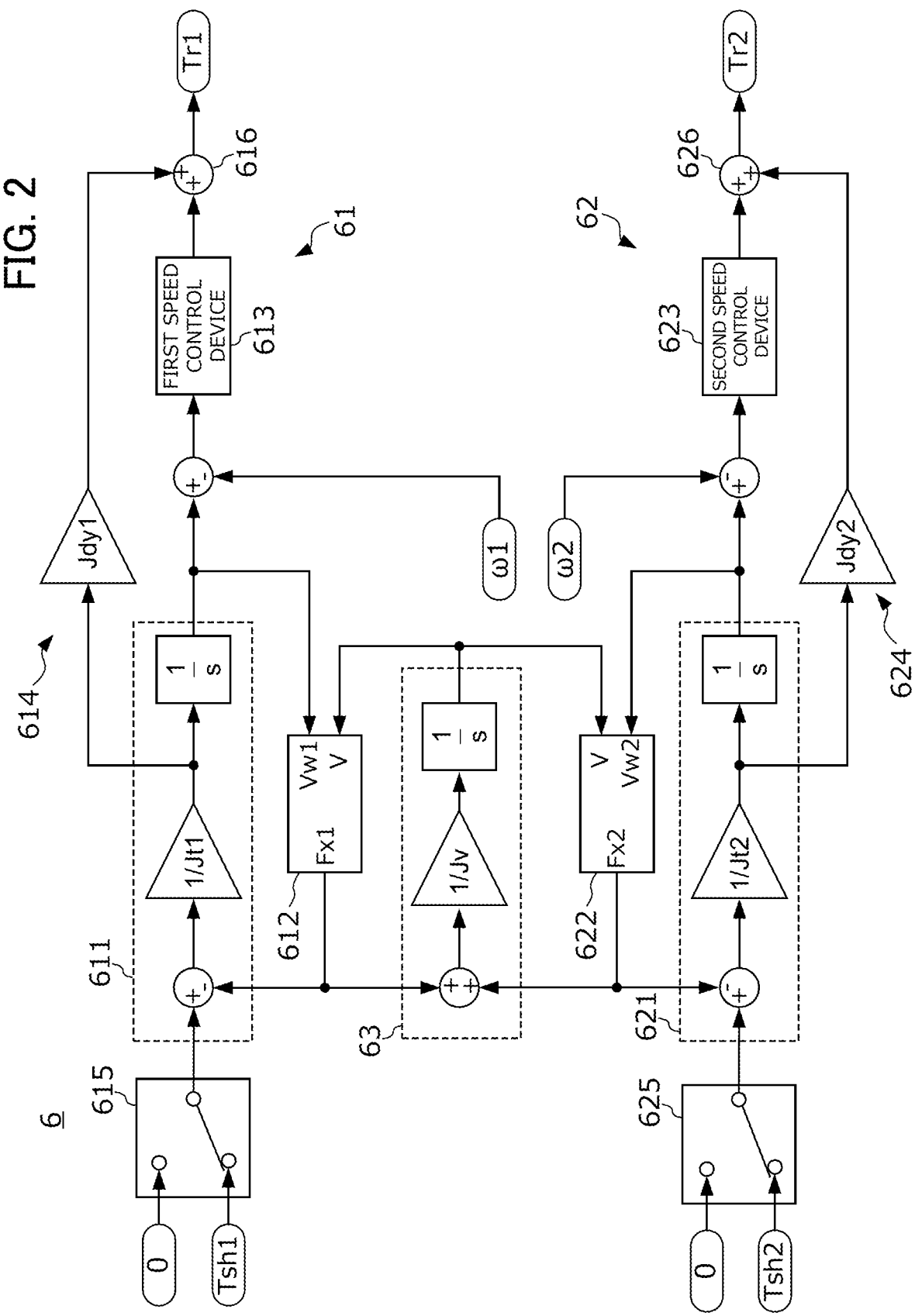
FIG. 2 is a block diagram illustrating the configuration of a control circuit of an output-side control device.
Figure 3:
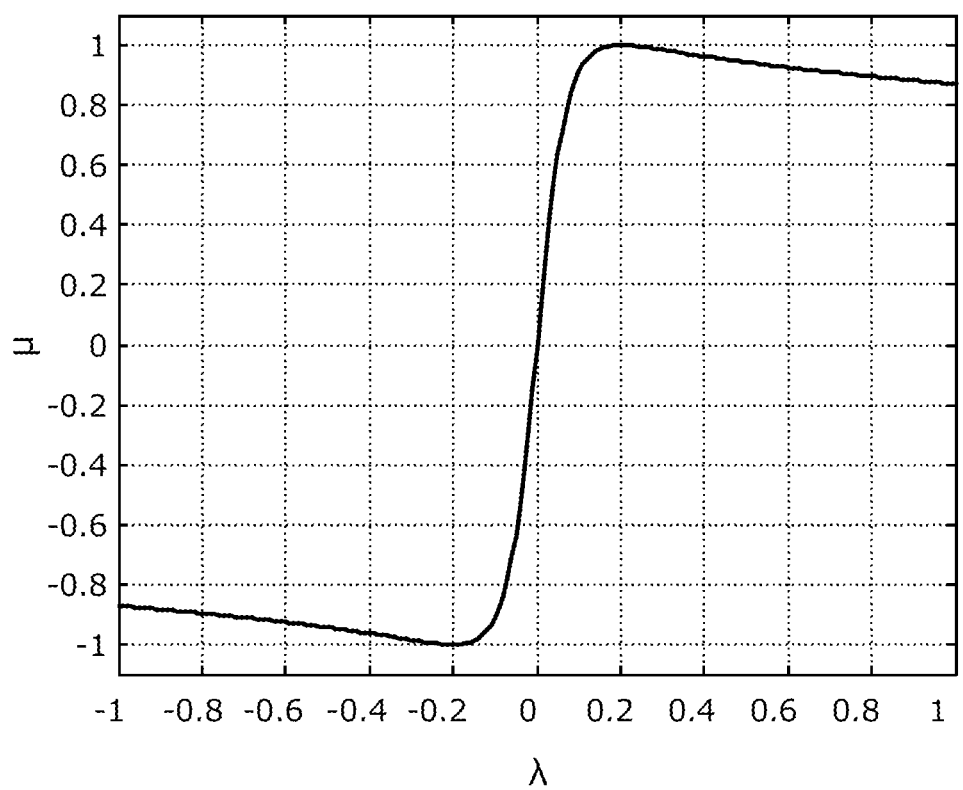
FIG. 3 is one example of a control map that determines a coefficient value of friction.

FIG. 2 is a block diagram illustrating the configuration of a control circuit of the output-side control device 6. The output-side control device 6 includes a first control circuit 61 that generates the first output-side torque command signal Tr1 based on the first output-side speed detection signal $\omega1$ and the first output-side shaft torque detection signal Tsh1; a second control circuit 62 that generates the second output-side torque command signal Tr2 based on the second output-side speed detection signal $\omega2$ and the second output-side shaft torque detection signal Tsh2; and a vehicle speed calculation unit 63 that calculates the speed of a virtual vehicle where the test piece W is mounted.

The first control circuit 61 includes a first tire speed calculation unit 611; a first vehicle drive torque calculation unit 612; a first speed control device 613; a first feed-forward input calculation unit 614; a first shaft torque input selector 615; and a first combination unit 616. The second control circuit 62 includes a second tire speed calculation unit 621; a second vehicle drive torque calculation unit 622; a second speed control device 623; a second feed-forward input calculation unit 624; a second shaft torque input selector 625; and a second combination unit 626.

The vehicle speed calculation unit 63 generates a vehicle speed signal V corresponding to the speed of the vehicle by the equation of motion of the vehicle (refer to the following equation (1)) that has, as inputs, a first vehicle drive torque signal Fx1 (to be described later) which corresponds to a vehicle drive force occurring due to a frictional force between a first virtual tire and a first virtual road surface and a second vehicle drive torque signal Fx2 (to be described later) which corresponds to a vehicle drive force occurring due to a frictional force between a second virtual tire and a second virtual road surface, and is characterized by a moment of inertia Jv of the virtual vehicle which travels using the first and second tires as drive wheels.

$$Fx1+Fx2=Jv \cdot dV/dt \quad (1)$$

More specifically, the vehicle speed calculation unit 63 generates the vehicle speed signal V by multiplying a signal, which is a sum of the first vehicle drive torque signal Fx1 generated by the first vehicle drive torque calculation unit 612 and the second vehicle drive torque signal Fx2 generated by the second vehicle drive torque calculation unit 622, by the reciprocal of the moment of inertia Jv of the vehicle, and performing an integral operation on the multiplication result.

The first shaft torque input selector 615 selectively switches an input to the first tire speed calculation unit 611 between the first output-side shaft torque detection signal Tsh1 and a signal with a value of zero. As the input to the first tire speed calculation unit 611, the first shaft torque input selector 615 normally sets the first output-side shaft torque detection signal Tsh1, and sets the signal with a value of zero when a stall test is performed.

The first tire speed calculation unit 611 generates a first tire speed signal Vw1 corresponding to the rotational speed of the first tire by the equation of motion of the first tire (refer to the following equation (2)) that has, as inputs, the first output-side shaft torque detection signal Tsh1 and the first vehicle drive torque signal Fx1 and is characterized by a moment of inertia Jt1 of the first tire.

$$Tsh1-Fx1=Jt1 \cdot dVw1/dt \quad (2)$$

More specifically, the first tire speed calculation unit 611 generates the first tire speed signal Vw1 by defining a signal, which is obtained by subtracting the first vehicle drive torque signal Fx1 from the first output-side shaft torque detection signal Tsh1, as a first tire drive torque signal which contributes to the rotation of the first tire, multiplying the first tire drive torque signal by the reciprocal of the moment of inertia Jt1 of the first tire, and performing an integral operation on the multiplication result.

The second shaft torque input selector 625 selectively switches an input to the second tire speed calculation unit 621 between the second output-side shaft torque detection signal Tsh2 and a signal with a value of zero. As the input to the second tire speed calculation unit 621, the second shaft torque input selector 625 normally sets the second output-side shaft torque detection signal Tsh2, and sets the signal with a value of zero when a stall test is performed.

The second tire speed calculation unit 621 generates a second tire speed signal Vw2 corresponding to the rotational speed of the second tire by the equation of motion of the second tire (refer to the following equation (3)) that has, as inputs, the second output-side shaft torque detection signal Tsh2 and the second vehicle drive torque signal Fx2 and is characterized by a moment of inertia Jt2 of the second tire. Since a specific procedure of calculating the second tire speed signal Vw2 is the same as the procedure of calculating the first tire speed signal Vw1, the detailed description thereof will be omitted.

$$Tsh2-Fx2=Jt2 \cdot dVw2/dt \quad (3)$$

The first vehicle drive torque calculation unit 612 generates the first vehicle drive torque signal Fx1 which corresponds to the vehicle drive force occurring due to the frictional force between the first tire and the first road surface which is virtually set, based on a difference between the first tire speed signal Vw1 and the vehicle speed signal V. Hereinafter, the procedure will be specifically described.

Firstly, the first vehicle drive torque calculation unit 612 calculates a first slip rate $\lambda1$ of the first tire on the first road surface by the following equation (4) based on the speed difference (Vw1−V) and the larger one of the speed signals Vw1 and V. Subsequently, the first vehicle drive torque calculation unit 612 determines a first coefficient value $\mu1$ of friction between the first tire and the first road surface based on a control map f1 illustrated in FIG. 3 which has the calculated first slip rate $\lambda1$ as an argument (refer to the following equation (5)). Incidentally, a control map that determines the coefficient value of friction can be appropriately selected depending on the condition (a snowy surface, a dry road surface, or the like) of the first road surface. Subsequently, the first vehicle drive torque calculation unit 612 generates the first vehicle drive torque signal Fx1 by multiplying a first normal force value Nz1, which the first tire receives from the first road surface, by the first coefficient value $\mu1$ of friction (refer to the following equation (6)). A constant which is determined in advance or a value which is estimated depending on the vehicle speed signal V or the like is used as the first normal force value Nz1.

$$\lambda1=(Vw1-V)/\max(Vw1,V) \quad (4)$$

$$\mu1=f1(\lambda1) \quad (5)$$

$$Fx1=Nz1 \cdot \mu1 \quad (6)$$

The second vehicle drive torque calculation unit 622 generates the second vehicle drive torque signal Fx2 which corresponds to the vehicle drive force occurring due to the frictional force between the second tire and the second road surface, based on the following equations (7) to (9) that have, as inputs, the second tire speed signal Vw2 and the vehicle speed signal V. Since a specific procedure of generating the second vehicle drive torque signal Fx2 is the same as the procedure of generating the first vehicle drive torque signal Fx1, the detailed description thereof will be omitted.

$$\lambda 2=(Vw2-V)/\max(Vw2,V) \quad (7)$$

$$\mu 2 = f2(\lambda 2) \quad (8)$$

$$Fx2 = Nz2 \cdot \mu 2 \quad (9)$$

As described above, the first control circuit 61 and the second control circuit 62 generate the vehicle speed signal V, the first tire speed signal Vw1, and the second tire speed signal Vw2 by virtually setting the first tire and the second tire which are connected to the output shafts SO1 and SO2 of the test piece W and the vehicle which travels on the first road surface and the second road surface using these tires as drive wheels, assuming these tires and the vehicle as independent objects having the moments of inertia Jt1, Jt2, and Jv, and then simultaneously solving the equations of motion (1) to (9) for these tires and the vehicle.

The first speed control device 613 generates a first feedback control input signal for eliminating a deviation between the first tire speed signal Vw1 and the first output-side speed detection signal ω1. The second speed control device 623 generates a second feedback control input signal for eliminating a deviation between the second tire speed signal Vw2 and the second output-side speed detection signal u2.

The first feed-forward input calculation unit 614 generates a first feed-forward control input signal by multiplying the difference between the first output-side shaft torque detection signal Tsh1 and the first vehicle drive torque signal Fx1 by a coefficient that is obtained by dividing a moment of inertia Jdy1 of the first output-side dynamometer 31 by the moment of inertia Jt1 of the first tire. The first combination unit 616 generates the first output-side torque command signal Tr1 by adding the first feedback control input signal generated by the first speed control device 613 and the first feed-forward control input signal generated by the first feed-forward input calculation unit 614.

The second feed-forward input calculation unit 624 generates a second feed-forward control input signal by multiplying the difference between the second output-side shaft torque detection signal Tsh2 and the second vehicle drive torque signal Fx2 by a coefficient that is obtained by dividing a moment of inertia Jdy2 of the second output-side dynamometer 32 by the moment of inertia Jt2 of the second tire. The second combination unit 626 generates the second output-side torque command signal Tr2 by adding the second feedback control input signal generated by the second speed control device 623 and the second feed-forward control input signal generated by the second feed-forward input calculation unit 624.

Figure 4:
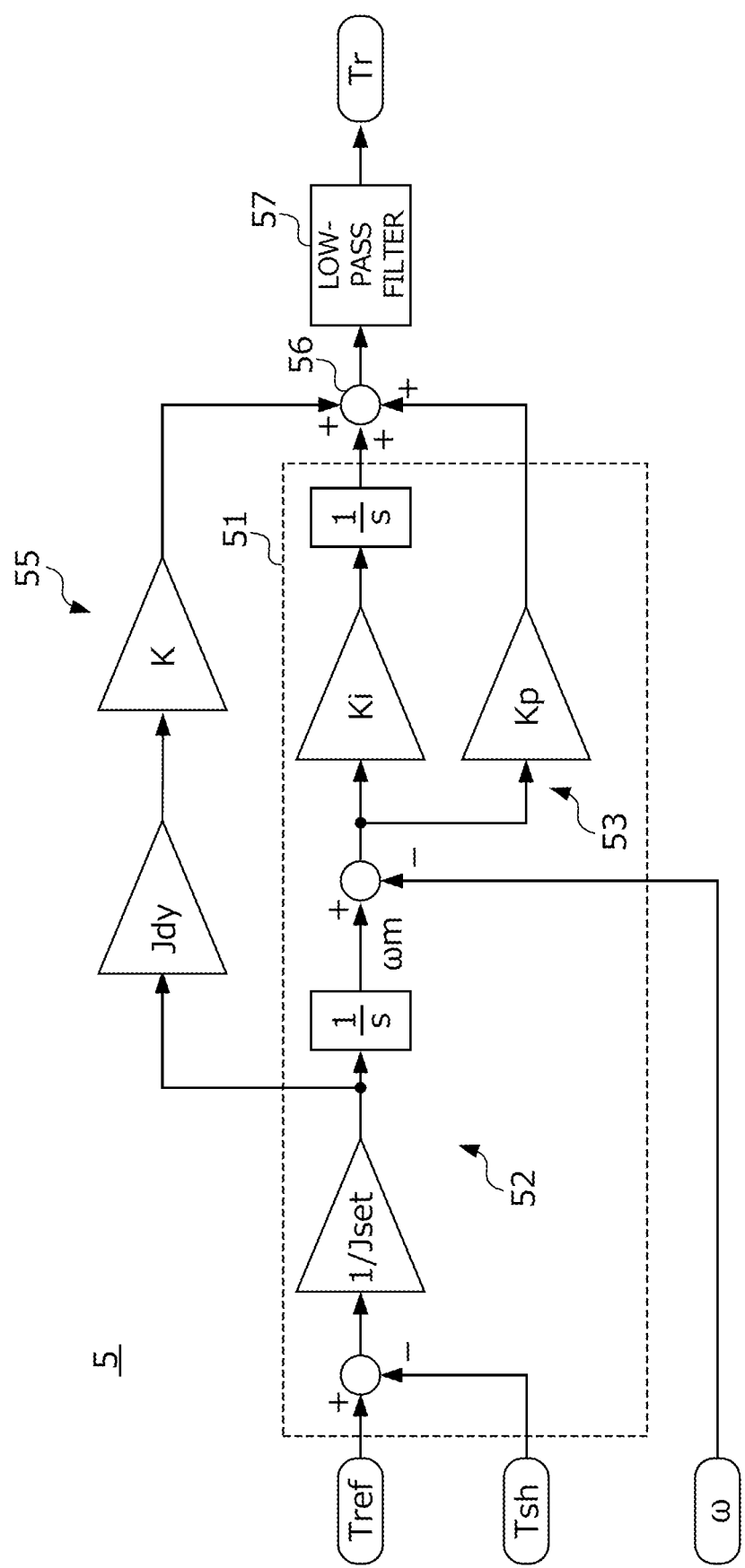
FIG. 4 is a block diagram illustrating the configuration of a control circuit of an input-side control device.

FIG. 4 is a block diagram illustrating the configuration of a control circuit of the input-side control device 5. FIG. 4 illustrates particularly a portion of the control circuit included in the input-side control device 5, the portion being responsible for the inertia-lowering control of the input-side dynamometer.

The input-side control device 5 includes a feedback controller 51, a feed-forward controller 55, a combination unit 56, and a low-pass filter 57, and generates the input-side torque command signal Tr by using these components.

The feedback controller 51 includes a model calculation unit 52 and a speed controller 53. The model calculation unit 52 calculates a motion of a virtual inertial body having a predetermined set moment of inertia set by using a signal difference (Tref−Tsh) between a higher order torque command signal Tref which is a higher order command signal for the input-side torque command signal and the input-side shaft torque detection signal Tsh.

Here, a higher order command generation device (not illustrated) generates the higher order torque command signal Tref based on a known method. In the engine connected to the input shaft SI of the test piece W in the completed vehicle, a periodic torque fluctuation occurs due to a combustion stroke of each cylinder. Accordingly, the higher order command generation device generates the higher order torque command signal Tref by combining a direct current signal and an alternating current signal so as to simulate such an actual engine torque fluctuation.

The model calculation unit 52 generates a model speed signal ωm which corresponds to the rotational speed of the inertial body when the virtual inertial body having the set moment of inertia Jset rotates under the application of a torque corresponding to the signal difference (Tref−Tsh), based on the equation of motion for the inertial body. Here, the set moment of inertia Jset is set to a value smaller than an input-side moment of inertia Jdy which is the known moment of inertia of the input-side dynamometer 21, more specifically, to a value equal to the moment of inertia of the engine to be connected to the test piece W. As illustrated in FIG. 2, the model calculation unit 52 generates the model speed signal ωm by integrating a result that is obtained by multiplying the signal difference (Tref−Tsh) by the reciprocal of the set moment of inertia Jset.

The speed controller 53 generates a first control input signal for eliminating a deviation between the model speed signal ωm and the input-side speed detection signal ω, based on a known feedback control principle. FIG. 4 illustrates a case where the first control input signal is generated according to a PI control principle that is specified by predetermined gains Ki and Kp; however, the feedback control principle used by the speed controller 53 is not limited to the PI control principle.

The feed-forward controller 55 generates a second control input signal by multiplying the signal difference (Tref−Tsh) by a coefficient that is set based on the input-side moment of inertia Jdy, the set moment of inertia Jset which is smaller than the input-side moment of inertia Jdy, and a predetermined gain K. In the feed-forward controller 55, the coefficient by which the signal difference (Tref−Tsh) is multiplied is set to a larger value as the input-side moment of inertia Jdy is increased, and is set to a smaller value as the set moment of inertia Jset is increased. FIG. 4 describes a case where a value obtained by multiplying a value, which is obtained by dividing the input-side moment of inertia Jdy by the set moment of inertia Jset smaller than the input-side moment of inertia Jdy, by the predetermined gain K is used as the coefficient by which the signal difference (Tref−Tsh) is multiplied; however, the present invention is not limited to the case. In addition, the value of the gain K is set to a value larger than one so as to obtain preferred control characteristics, specifically, for example, to "1.2".

The combination unit 56 inputs a signal, which is obtained by adding the first control input signal generated by the feedback controller 51 and the second control input signal generated by the feed-forward controller 55, to the low-pass filter 57.

The low-pass filter 57 generates the input-side torque command signal Tr by attenuating a component, which has a higher frequency than a predetermined cut-off frequency fc, from the output signal of the combination unit 56. The cut-off frequency fc of the low-pass filter 57 is set in the vicinity of a resonant frequency (for example, approximately 20 [Hz] as will be described later with reference to FIG. 6 and the like) which appears in the mechanical characteristics of an input shaft SI side of the test piece W, such that the inertia-lowering control of the input-side dynamometer 21 is stably realized by the input-side control device 5. Here, the term "the vicinity of the resonant frequency" implies that the cut-off frequency fc does not need to exactly coincide with the resonant frequency and a deviation of approximately several [Hz] is allowed. In addition, a low-pass filter in the second-order function form is used as the low-pass filter 57 such that the foregoing inertia-lowering control is more stably realized. Hereinafter, the reason the cut-off frequency fc and the low-pass filter 57 in the form of a function described above are used will be described.

Figure 5:
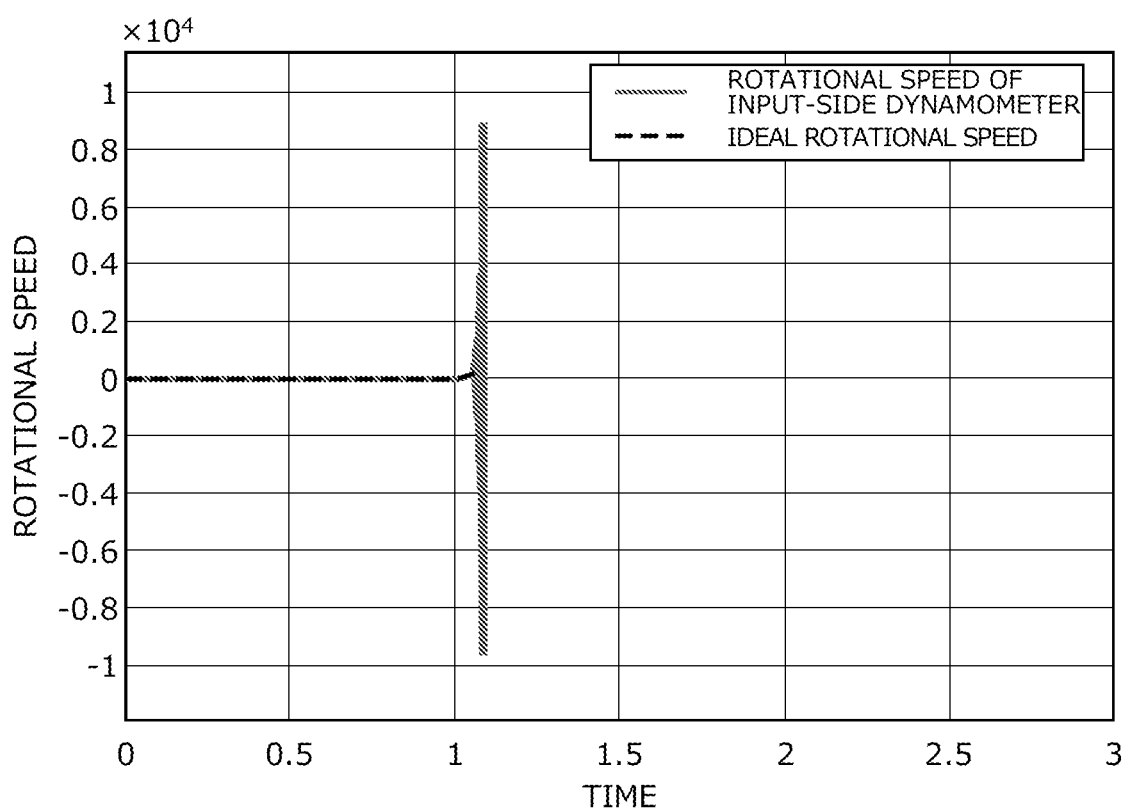
FIG. 5 is a graph showing a change in the rotational speed of an input-side dynamometer when inertia-lowering control is performed using an input-side control device of a comparative example.
Figure 10:
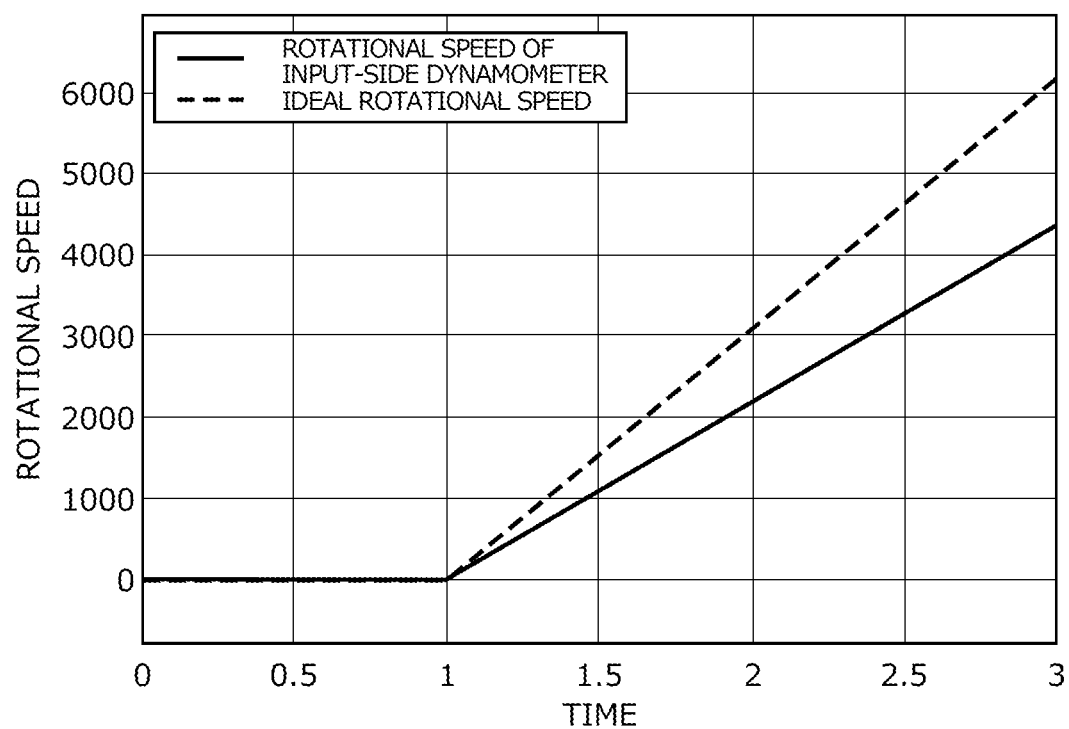
FIG. 10 is a graph showing a change in the number of revolutions of an input-side dynamometer when a torque command signal which is not subjected to the inertia-lowering control is input to the input-side dynamometer.

FIG. 5 is a graph showing a change in the rotational speed of the input-side dynamometer 21 when the inertia-lowering control of the input-side dynamometer 21 is performed using an input-side control device of a comparative example. Here, the input-side control device of the comparative example is obtained by removing the low-pass filter 57 from the input-side control device 5 of this embodiment illustrated in FIG. 4. In addition, the dashed line in FIG. 5 illustrates an ideal change in rotational speed which is defined in the same manner as that in FIG. 10. As shown in FIG. 5, the input-side control device of the comparative example which does not include the low-pass filter 57 cannot perform a stable inertia-lowering control, and the rotational speed of the input-side dynamometer 21 oscillates greatly. The reason the input-side control device of the comparative example cannot realize a stable inertia-lowering control is considered to be, as will be described hereinafter, due to a difference in mechanical characteristics between the input shaft SI side and output shaft SO1 and SO2 sides of the test piece W.

Figure 6:
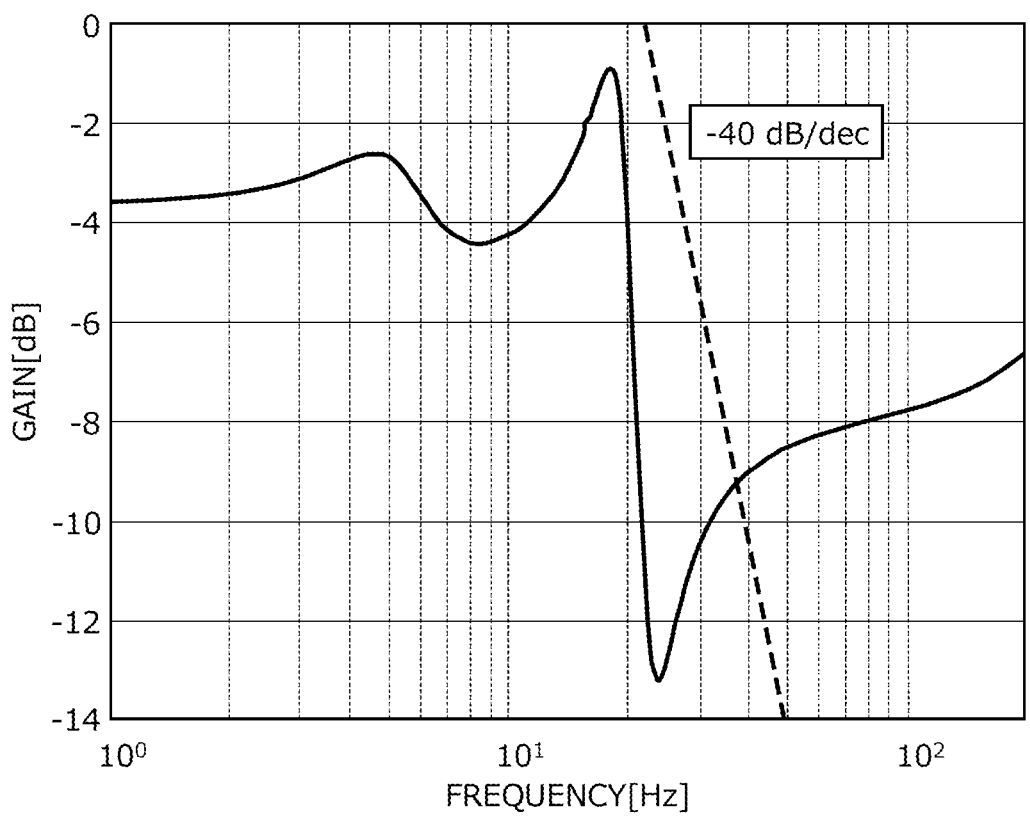
FIG. 6 is a Bode plot illustrating the mechanical characteristics of an input shaft side of a test piece.

FIG. 6 is a Bode plot illustrating the mechanical characteristics of the input shaft SI side of the test piece W. Here, more specifically, the mechanical characteristics of the input shaft SI side refer to a transfer function (Tsh(s)/Tr(s)) from the input-side torque command signal Tr to the input-side shaft torque detection signal Tsh.

Figure 7:
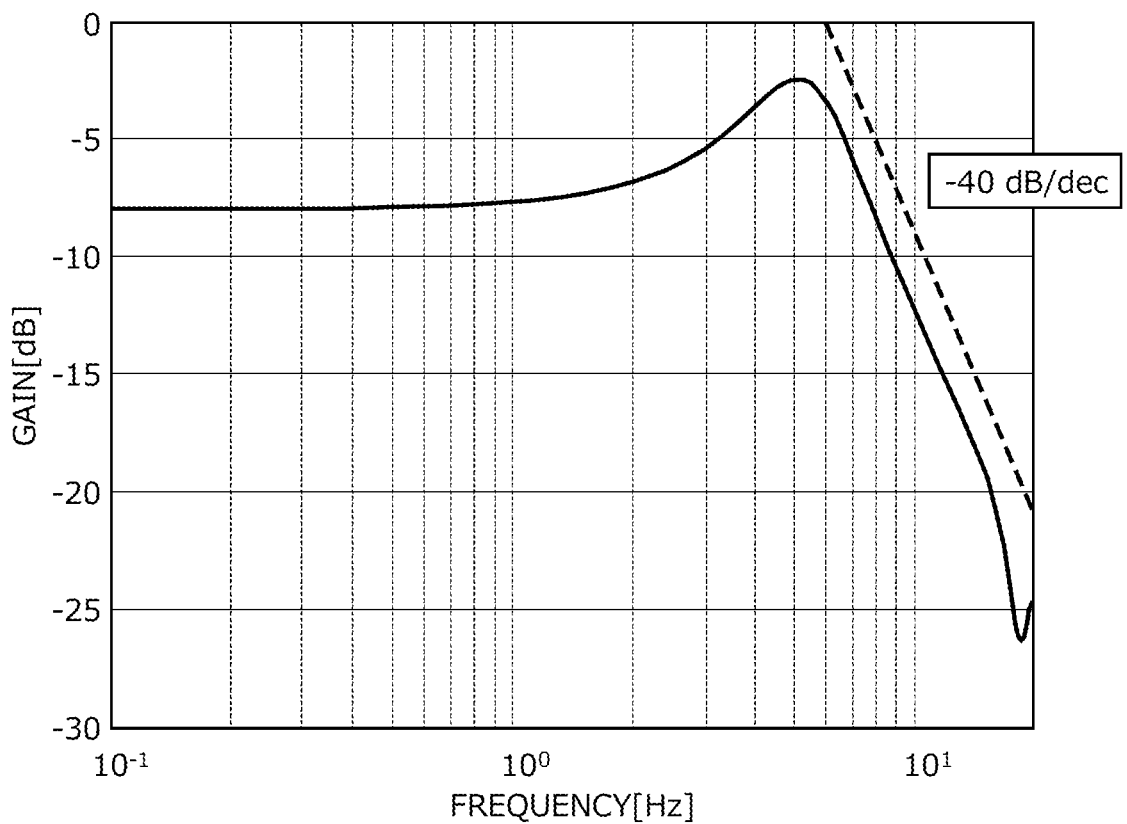
FIG. 7 is a Bode plot illustrating the mechanical characteristics of an output shaft side of the test piece.

FIG. 7 is a Bode plot illustrating the mechanical characteristics of the output shaft SO1 side of the test piece W. Here, more specifically, the mechanical characteristics of the output shaft SO1 side refer to a transfer function (Tsh1(s)/Tr1(s)) from the first output-side torque command signal Tr1 to the first output-side shaft torque detection signal Tsh1. Incidentally, since the mechanical characteristics of the output shaft SO2 side are qualitatively the same as those in FIG. 7, the illustration and detailed description thereof will be omitted.

As illustrated in FIGS. 6 and 7, a resonance phenomenon where an input to output ratio increases at a specific frequency due to the torsional vibration of the shaft occurs in the mechanical characteristics of the test piece W. More specifically, in the mechanical characteristics of the input shaft SI side, a primary resonant point appears at approximately 20 [Hz] and a primary antiresonant point appears at approximately 25 [Hz]. In addition, in the mechanical characteristics of the output shaft SO1 side, a primary resonant point appears at approximately five [Hz].

The point to which special attention is paid in the difference between the mechanical characteristics of the input shaft SI side and the mechanical characteristics of the output shaft SO1 side is an attenuation gradient on a higher frequency side than each primary resonant frequency. In the mechanical characteristics of the output shaft SO1 side, the attenuation gradient on the higher frequency side than the primary resonant frequency is approximately −40 [dB/dec] as illustrated by the dashed line in FIG. 7. In contrast, in the mechanical characteristics of the input shaft SI side, the input to output ratio on the higher frequency side than the primary resonant frequency decreases toward the antiresonant point at an attenuation gradient steeper than −40 [dB/dec], and then increases again.

The factor which makes the inertia-lowering control by the input-side control device of the comparative example unstable is considered to be due to differences in attenuation gradient on a higher frequency side than a primary resonant frequency. In addition, among the differences in attenuation gradient, particularly, the point that on an input side, the input to output ratio is not sufficiently attenuated on a frequency side (for example, 100 [Hz] or higher) higher than the antiresonant point is considered to make the inertia-lowering control unstable. Accordingly, the cut-off frequency fc and a specific function form of the low-pass filter 57 provided in the input-side control device 5 according to this embodiment are set such that the attenuation gradient on the input shaft SI side substantially coincides with that on the output shaft SO1 side, more specifically, such that the input to output ratio on the input side is attenuated at −40 [dB/dec] also on the foregoing higher frequency side.

Figure 8:
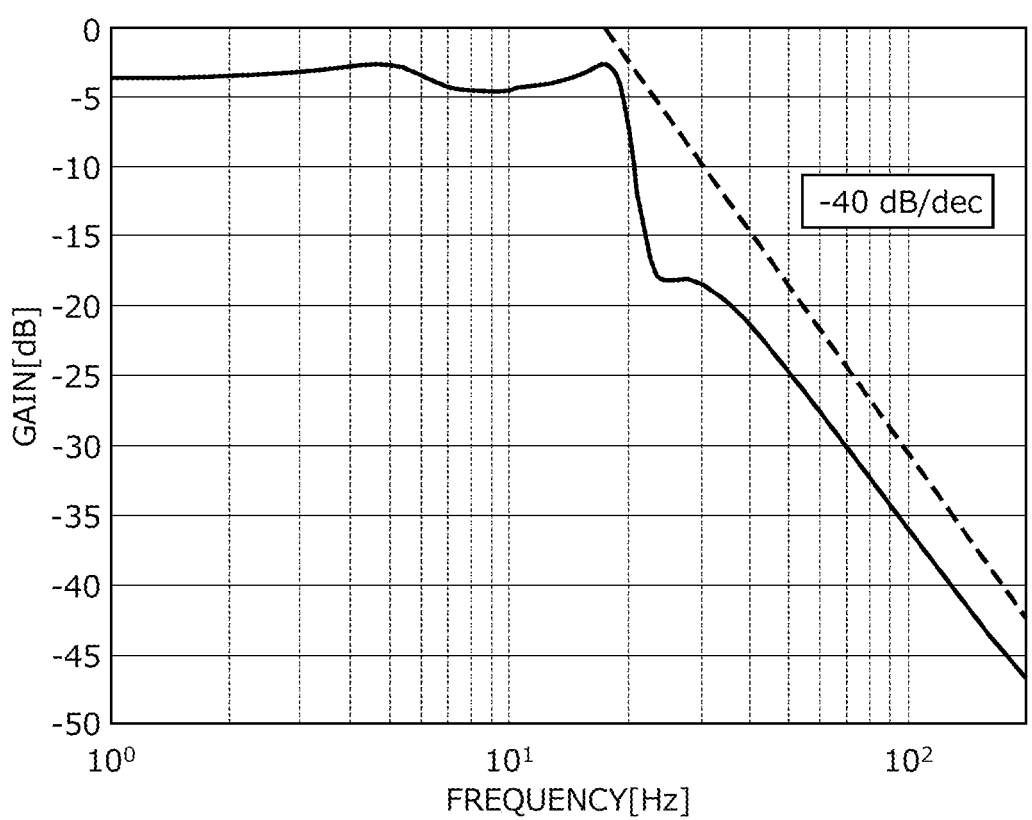
FIG. 8 is a Bode plot illustrating the mechanical characteristics of the input shaft side of the test piece from the viewpoint of an input to a low-pass filter in the test system to which the input-side control device according to this embodiment is applied.

FIG. 8 is a Bode plot illustrating the mechanical characteristics of the input shaft SI side of the test piece W from the viewpoint of an input to the low-pass filter 57 in the test system 1 to which the input-side control device 5 according to this embodiment is applied. Here, the cut-off frequency fc of the low-pass filter 57 of the input-side control device 5 is set to 20 [Hz] in the vicinity of the resonant frequency on the input shaft SI side. In addition, the function form of the low-pass filter 57 is second order. As illustrated in FIG. 8, since the low-pass filter 57 described above is used, in the mechanical characteristics of the input shaft SI side, the attenuation gradient on the higher frequency side than the primary resonant frequency is approximately −40 [dB/dec], and substantially coincides with the attenuation gradient on the output shaft SO1 side.

Figure 9:
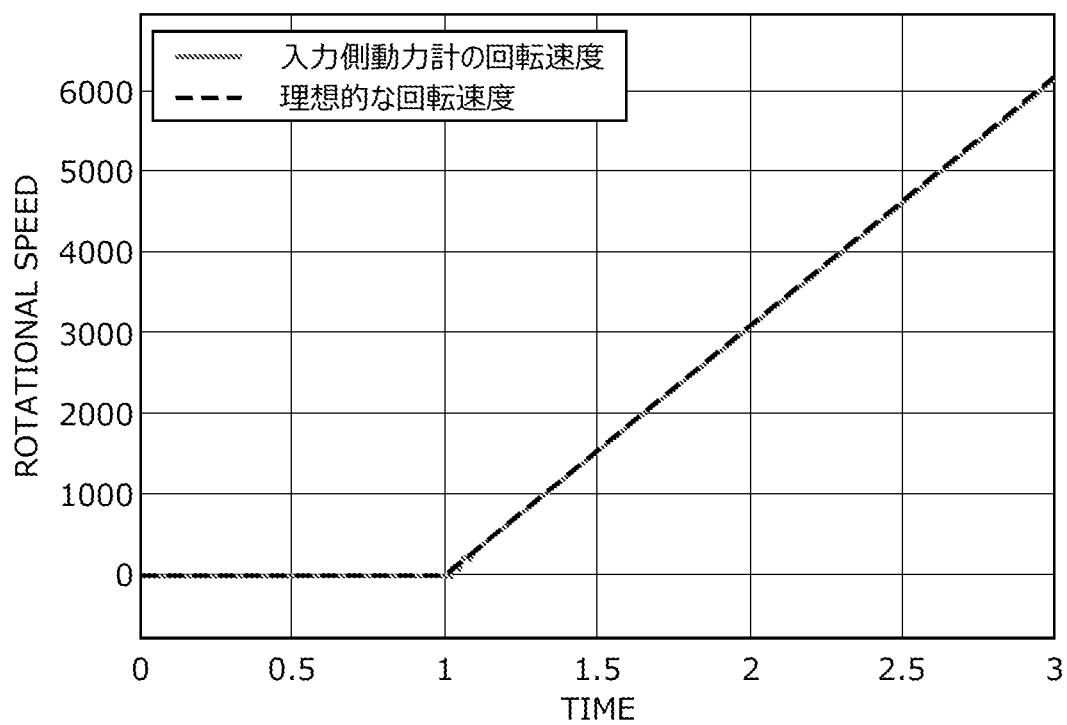
FIG. 9 is a graph showing a change in the rotational speed of an input-side dynamometer when the inertia-lowering control of the input-side dynamometer is performed using the input-side control device according to this embodiment.

FIG. 9 is a graph showing a change in the rotational speed of the input-side dynamometer 21 when the inertia-lowering control of the input-side dynamometer 21 is performed using the input-side control device 5 according to this embodiment. The dashed line in FIG. 9 illustrates an ideal change in rotational speed which is defined in the same manner as that in FIG. 10. As shown in FIG. 9, the input-side control device 5 of this embodiment makes the attenuation gradient on the input shaft SI side equal to that on the output shaft SO1 side by using the low-pass filter 57 so that the input-side control device 5 can perform a stable inertia-lowering control. In addition, the inertia-lowering control using the input-side control device 5 can cause a change in the rotational speed of the input-side dynamometer 21 having the input-side moment of inertia Jdy larger than the set moment of inertia Jset to substantially coincide with the ideal change in rotational speed illustrated by the dashed line. Namely, the input-side control device 5 can accurately realize inertia-lowering control to adjust a moment of inertia of the input-side dynamometer 21 to the set moment of inertia Jset smaller than the input-side moment of inertia Jdy.

One embodiment of the present invention has been described above; however, the present invention is not limited thereto. Changes may be appropriately made to the detailed configurations without departing from the concept of the present invention.

EXPLANATION OF REFERENCE NUMERALS

1 TEST SYSTEM
W TEST PIECE
SI INPUT SHAFT
SO1, SO2 OUTPUT SHAFT
21 INPUT-SIDE DYNAMOMETER (DYNAMOMETER)
22 INPUT-SIDE INVERTER (INVERTER)
23 INPUT-SIDE ENCODER (SPEED DETECTOR)
24 INPUT-SIDE SHAFT TORQUE METER (SHAFT TORQUE DETECTOR)
5 INPUT-SIDE CONTROL DEVICE (DYNAMOMETER CONTROL DEVICE)
51 FEEDBACK CONTROLLER
55 FEED-FORWARD CONTROLLER
57 LOW-PASS FILTER (FILTER)
6 OUTPUT-SIDE CONTROL DEVICE

The invention claimed is:

1. A test system comprising:
a dynamometer coupled to an input shaft of a test piece including the input shaft and an output shaft;
an inverter supplying an electrical power in accordance with a torque command signal to the dynamometer;
a speed detector generating a speed detection signal in accordance with a rotational speed of the dynamometer;
a shaft torque detector generating a shaft torque detection signal in accordance with a shaft torque applied to the input shaft; and
a dynamometer control device generating the torque command signal by using the speed detection signal and the shaft torque detection signal;
wherein the dynamometer control device includes:
a feedback controller that uses a signal difference between a higher order command signal for the torque command signal and the shaft torque detection signal to generate a model speed signal which corresponds to a rotational speed of an inertial body having a set moment of inertia smaller than a moment of inertia of the dynamometer when the inertial body makes a motion under an application of a torque corresponding to the signal difference, and generate a first control input signal for eliminating a difference between the model speed signal and the speed detection signal;
a feed-forward controller that generates a second control input signal by multiplying the signal difference by a coefficient of which a value is set based on the moment of inertia of the dynamometer and the set moment of inertia; and
a filter that generates the torque command signal by attenuating a component, which has a higher frequency than a cut-off frequency that is set in the vicinity of a resonant frequency on an input shaft side of the test piece, from a signal obtained by combining the first control input signal and the second control input signal.

2. The test system according to claim 1, wherein the test piece is a drivetrain of a vehicle, and the filter is a second-order low-pass filter.

3. The test system according to claim 1, wherein the coefficient is set to a larger value as the moment of inertia of the dynamometer is increased, and is set to a smaller value as the set moment of inertia is increased.

4. The test system according to claim 2, wherein the coefficient is set to a larger value as the moment of inertia of the dynamometer is increased, and is set to a smaller value as the set moment of inertia is increased.

* * * * *